Figure 1:
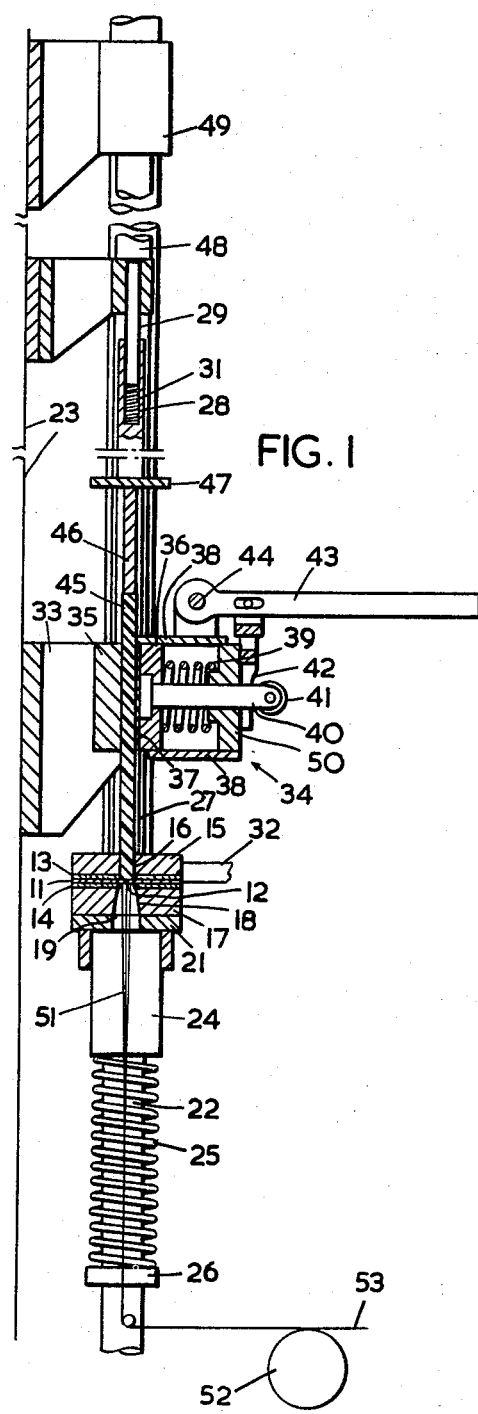

Jan. 26, 1960  H. E. B. YOUNG ET AL  2,922,187
MELT SPINNING APPARATUS
Filed Jan. 25, 1956  3 Sheets-Sheet 1

H.E.B. YOUNG
D. FINLAYSON
INVENTORS

ATTORNEYS

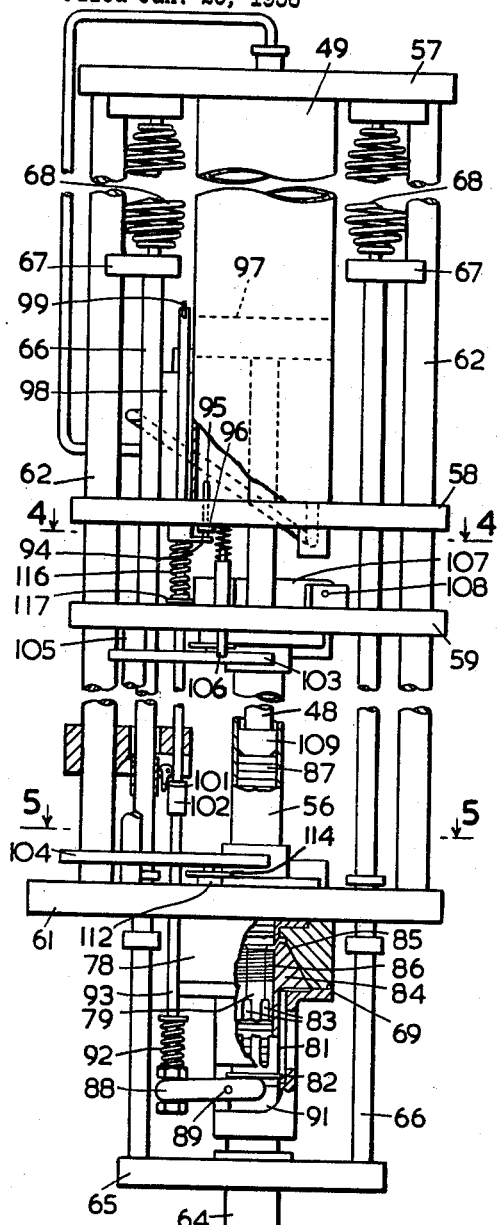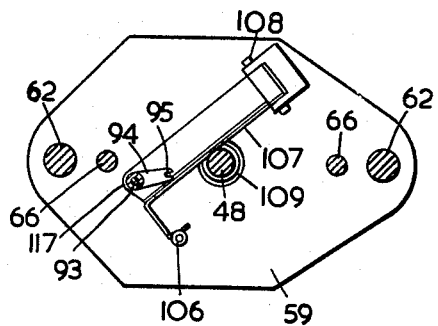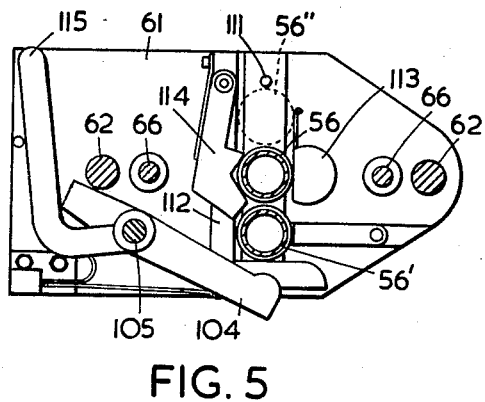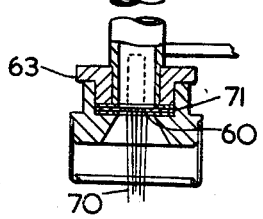
FIG. 4
FIG. 5
FIG. 3

United States Patent Office 2,922,187
Patented Jan. 26, 1960

2,922,187
MELT SPINNING APPARATUS

Harry Edward Bellairs Young and Donald Finlayson, Spondon, near Derby, England, assignors to British Celanese Limited, a corporation of Great Britain Application January 25, 1956, Serial No. 561,307

Claims priority, application Great Britain February 4, 1955

8 Claims. (Cl. 18—8)

This invention relates to the production of artificial textile fibres and other extruded products such as bristles, straws, ribbons, rods and the like, and particularly to a method and apparatus for the production of such products from fusible filament-forming materials (for example cellulose acetate) by melt extrusion. The invention is especially concerned with a process and apparatus of a kind in which a block or series of blocks constituting a column of solid material is urged against a heated surface to fuse the material at the leading face of the column by contact with the heated surface, the fused material being drawn away and formed into filaments and other extruded products.

According to the present invention, in a process of the kind referred to, the heated surface is resiliently urged against the leading face of the column, and the column is alternately moved forward by pressure applied to its rear face, and laterally gripped so as to be held stationary while the pressure on its rear face is relieved, and fresh material is added to the column at said rear face when said pressure is relieved. The effect of the invention is that, by continuously urging the heated surface against the leading face of the column, the pressure necessary for the fusion of the material at a steady rate, and for the supply of fused material to be drawn away and formed into extruded products is continuously maintained, notwithstanding the interruption in the mode of forwarding the column relatively to the heated surface necessitated by the intermittent supply of fresh material to the rear face of the column. The fusion of the filament-forming material can thus be carried out as a continuous operation, as can also the formation of the fused material into extruded products. The process can be carried out by means of an apparatus according to the invention, comprising a surface adapted to be heated, means for urging a series of blocks constituting a column of solid material against said surface so as to fuse the material at the leading face of said column, means for resiliently urging said surface against said leading face, means for applying pressure to the rear face of said column to move it forward against said surface and means adapted to act in alternation with said pressure-applying means for laterally gripping said column to hold it stationary while the pressure on its rear face is relieved for the purpose of adding fresh material at said rear face.

The invention is of particular importance as a method of carrying out the invention described in United States application Serial No. 423,743, filed April 16, 1954, in which solid filament-forming material in the form of a coherent block is pressed against a heated plate having one or more spinning orifices therein and is melted at the face of said block by heat supplied from said plate, the molten material passing through said orifices and being formed thereby into filaments which are drawn away and collected. The plate is preferably heated by electrically generating heat in the substance of the plate itself, by passing an electric current through the plate. The heated plate need not consist of a single sheet of metal having spinning orifices therein but may be a laminar element consisting of two or more closely spaced layers in series of which the last contains the spinning orifices proper while the remaining layer or layers are perforated to permit the passage of the material. In the application of the present invention to this method the rear surface of the heated plate is the heated surface of the present invention, which is resiliently and continuously urged against the leading face of the column of filament-forming material. The present invention may, however, be applied in other processes in which it is required to fuse the leading face of an advancing column of solid filament-forming material, e.g. methods of forming filamentary materials in which the spinning orifices are not formed in or close to the heated surface at which the material is fused, but are separated therefrom by a substantial space which is traversed by the molten material forwarded under the pressure of the column of solid material against the heated surface or otherwise.

The application of the forwarding pressure to the rear face of the column may be effected by applying a controlled (preferably uniform) pressure to the rear face of the column or it may be applied by positively urging forward the rear face of the column at a controlled rate, e.g. by positively driven cams or the like. In either case, the position of the heated surface in space, variable under the resilient pressure applied to it, can be employed to adjust the average rate of advancement of the column in relation to the rate of fusion by the heated surface. Thus, the time ratio between the periods of application of pressure to the rear face of the column and the periods of gripping of the sides of the column may be varied, or the controlled pressure, or the controlled rate of advancement of the rear face of the column. Alternatively, where the mean rate of advancement of the rear face of the column is fixed, the rate of supply of heat to the plate can be varied, e.g. by varying the supply voltage of an electric heater current applied to the plate, or, where the heater current supplied is constant, by shunting a variable part of said current through a shunt resistance in parallel with the plate.

The frequency with which an alternation is effected between the application of forwarding pressure to the rear face of the column, and the gripping of the sides of the column, will be chosen in accordance with the mode of operation desired and the size of each fresh additional charge of solid material added to the rear face of the column while pressure thereon is relieved. Thus the units added to the column may be in the form of small single blocks or tablets supplied at frequent intervals from a reservoir of such blocks or they may be in the form of pre-assembled columns of such tablets or large single blocks or slabs. The latter arrangement is most suitable when the provision of each fresh charge is to be effected by hand, as by an operator visiting the unit at regular intervals. The former arrangement is better suited for automatic operation in which the tablets are drawn at regular and short intervals from a supply hopper and added to the rear face of the column. In this arrangement, one method of controlling the average rate of advancement of the column, in accordance (for example) with the position of the heated surface as indicated above, is to arrange for the regular supply of fresh blocks or tablets to be suspended when the heated surface has been forced, by the supply of fresh material, beyond a fixed datum point.

The blocks of filament-forming material employed for the purpose of the present invention may be precast from the melt or formed from powdered or granular material in the manner described in United States application Serial No. 423,743, filed April 16, 1954, the conditions appropriate for the production of such blocks being as set out in that specification. The materials to which the invention is applicable are also as set out in that specification and include cellulose acetate (whether fully acetylated or triacetate or a partially de-acetylated or secondary acetate) and other organic derivatives of cellulose, linear polyamides such as polyaminocaproic acid and polyhexamethylene adipamide, polyaminotriazoles, polyurea, 4.4-polyurethane and polyethylene, and mixtures of such materials.

Figure 2:
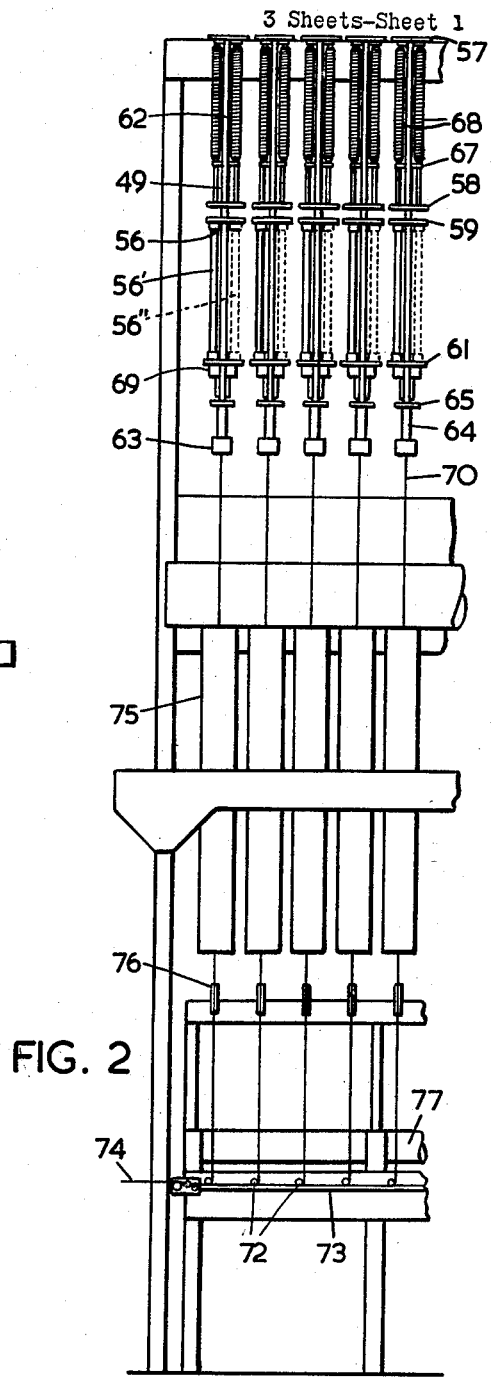
Figure 7:
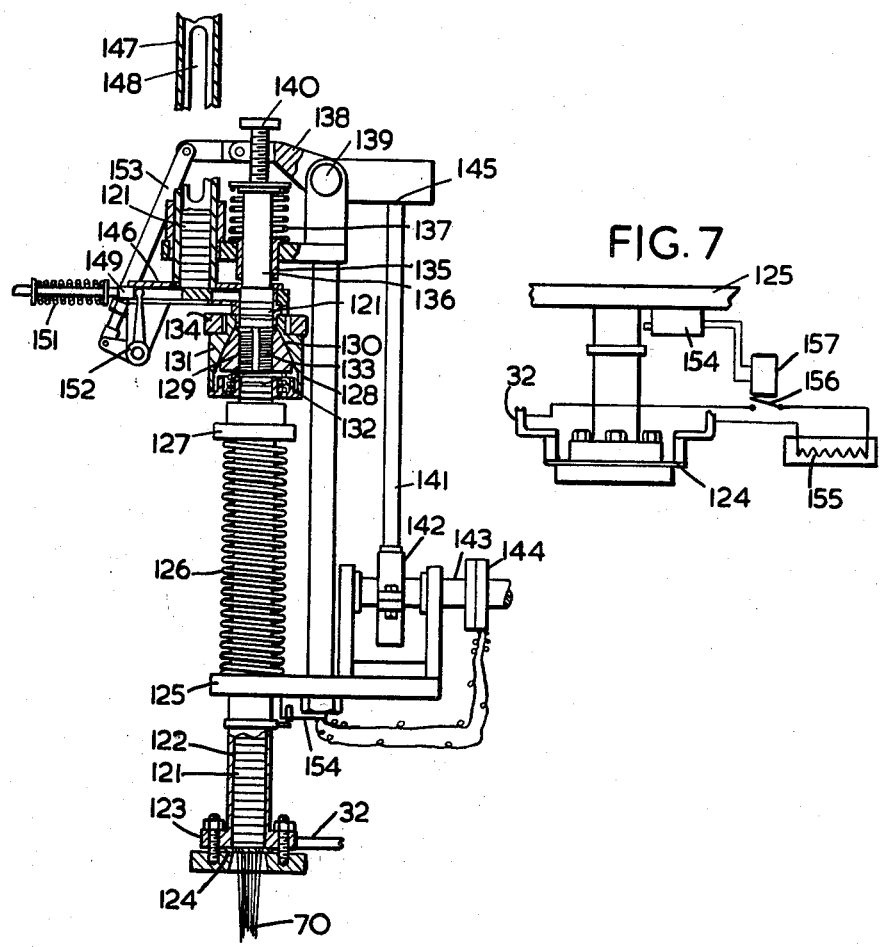
Figure 6:
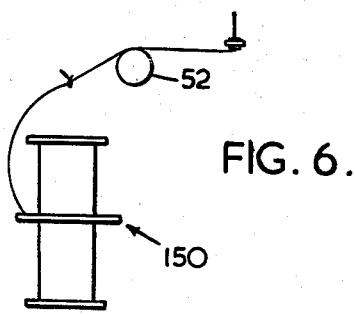

By way of example, three forms of apparatus in accordance with the invention, each designed for carrying out the process described in United States application Serial No. 423,743, will now be described in greater detail with reference to the accompanying drawings in which:

Figure 1 is a sectional side elevation of a simple form of apparatus for dealing with substantial charges of material supplied individually to the machine, Figure 2 is a general front elevation of a second form of apparatus for dealing with individual charges each in the form of a column of tablets, Figure 3 is a side elevation on a larger scale, partly in section, of one unit of the apparatus shown in Figure 2, Figures 4 and 5 are sectional plan views taken on the lines 4—4, and 5—5 respectively of the Figure 3, Figure 6 is a side elevation, partly in section of a third form of apparatus for dealing with material supplied as a number of small blocks or tablets to be inserted at frequent intervals, and Figure 7 shows an alternative detail of the control means of Figure 6.

In the form of apparatus shown in Figure 1 the heated plate constituting the heating surface in accordance with the present invention is in the form of a strip 11 of stainless steel, 6" in length, 1.125" in width and 0.04" in thickness. The jet strip is bored with three rows of circular orifices 12, each 3" long, the rows being spaced at .135" from each other and the orifices in each row being spaced at 0.09" and being staggered with reference to the orifices in the other two rows. The strip 11 is clamped between two layers 13, 14 of insulating material, each having an aperture therein of 3" in length by ½" in width exposing the spinning orifices 12. The layers 13, 14 of insulating material and the jet 11 are clamped between an upper block 15 which is also formed with an aperture 16 of 3" x ½" constituting a shallow well with the spinning orifices 12 at the bottom, and a lower block 17 in which a similar aperture 18 at the upper face of the block is flared to 1" in width at the lower face 19. The lower block rests on a channel plate 21 having a corresponding aperture of 1" x 3". The ends of the channel plate 21 are bored for the passage of two circular-section standards 22 forming part of the frame of the machine indicated generally at 23 and are furnished with depending collars 24 which guide the plate 21 in its motion up and down the standards 22. Beneath the collars 24 are two strong springs 25 which abut against fixed collars 26 on the standards 22. From the top of the upper block 15, near the ends of the rectangular well 16, rise two rods 27 of ¾" diameter which are bored at their upper ends at 28 to ½" diameter and are entered by two further rods 29 depending from the frame of the machine, and acting against light springs 31 in the bottom of the bores 28. Heater current is supplied to the ends of the jet strip 11 by suitable flexible connections 32. The assemby thus described constitutes the means by which the heated surface, constituted by the jet strip 11, is resiliently urged upwards.

Above the jet strip 11, on a fixed bracket 33, is mounted a gripper assembly 34. This comprises a rear plate 35 fixed in line with the rear edge of the jet area 16 and a front plate 36 which is loosely mounted relatively to the rear plate 35. The inner surface of the front plate is lined with a facing 37 of rubber. The bracket 33 carrying the gripper assembly 34 comprises two side plates 38 to which the rear plate 35 is welded and which extend forward to form part of a box-like structure in front of the front plate 36. Within the box-like structure is a powerful helical spring 39 urging the front plate 36 forward. A pull-rod 40 extending forward from the front plate 36, however, passes through the front face 50 of the box and is provided at its free end with a pair of anti-friction rollers 41 on a horizontal axis. Between the rollers 41 and the front face 50 of the box is a vertically slidable cam member 42 operated by a generally horizontal lever 43 pivoted at 44 on the top of the box. When the lever and cam 43, 42 are in the raised position the spring 39 is free to force the front plate 36 towards the rear plate 35, but when the lever 43 is pressed down the cam 42 acts on the rod 40 and pulls the front plate 36 forward against the action of the spring 39.

The filament-forming material is supplied in slags 45, 6" x 3" x ½", made by compressing powdered cellulose triacetate in a heated mould of the appropriate shape to a density of 1.2 grammes per cc. The slabs 45 are fed manually into the apparatus, with the long edge vertical and the horizontal cross-section fitting over the clutch assembly 34 and in vertical alignment within the well 16 leading to the jet strip 11. The slabs 45 are pressed into engagement with the jet strip 11 by a presser member 46 having a section of 3" x ½", and mounted beneath a plate 47 similar to the plate 21 carrying the jet assembly and slidable on the same pair of standards 22. The upper surface of the plate 47 is acted on by a pair of rams 48 the upper ends of which fit into fixed pneumatic cylinders 49 supplied with compressed air.

In the operation of the device the column of material consisting of one or more slabs 45, is pressed downwards against the rear (upper) face of the jet strip 11, electric current is passed along the jet strip through leads 32 so as to fuse the material at the leading face of the column, and the fused material is forced through the orifices 12 in the jet strip 11 from which it emerges in the form of filaments 51. The filaments 51 are drawn away by means of a feed roller 52 by which they are forwarded as a light tow 53 of continuous filaments, to be used as such or combined with other tows to form a heavy tow, e.g. for conversion into staple fibres. When the upper surface of the uppermost slab 45 has descended nearly to the top of the gripper assembly 34, the handle 43 of the gripper assembly is raised so that the slab 45 extending through it is firmly gripped. In this condition, the jet strip 11 can rise under the influence of its mounting springs 25, so that the fused material continues to be forced through the spinning orifices. The rams 48 and pressing element 46 are then raised and a fresh slab 45 of filament-forming material is inserted beneath the pressing element and over the top of the existing slab. The rams 48 are then brought down again, the lever 43 of the gripping device is lowered, and spinning continues until the slab 45 just inserted itself reaches just above the level of the gripping device 34 when the operation is repeated and so on.

The form of apparatus shown in Figures 2 to 6 is designed, like that of Figure 1, to deal with large charges of material supplied individually to the machine by hand. In this case, however, each charge is in the form of a column of tablets of a diameter of 1¼" and a thickness of ¼" supplied in a magazine tube of the order of 2' in length and indicated at 56 in Figure 2. The magazines are inserted in the machine by hand but the change-over is effected automatically on exhaustion of the active magazine. The position of a fresh magazine is indicated in Figure 2 (and Figure 6) at 56' and that of an exhausted and displaced magazine at 56".

Extrusion is effected, as in Figure 1, by means of a ram 48 operated by an air cylinder 49 and entering the top of the active magazine 56. The cylinder 49 is mounted between two frame plates 57, 58 while the magazine 56 is lodged between two frame plates 59, 61, all secured to the frame of the machine and tied one to another by means of heavy tie rods 62. The jet assembly 63 is mounted at the lower end of a reservoir tube 64 supported by a plate 65 which, like the channel plate 21 of Figure 1 is floating. The plate 65 is suspended on rods 66 which extend upwards through the plates 58, 59, 61 and are secured to yokes 67, each supported by a pair of heavy tension springs 68 from the upper frame plate 57. The material being spun passes, under the influence of the ram 48, from the magazine 56 to the reservoir tube 64 by way of a clutch assembly 69. The filaments 70 emerge from the spinning orifices 60, arranged in a circle in the jet plate 71 clamped in the jet assembly 63, and pass downwards to a guide 72 which guides them into a trough 73 by which they, and the filaments from the other units of the series (shown in Figure 2), are led along the front of the machine to be collected in the form of a heavy tow 74. On their way from the jet assembly 63 to the guide 72, the filaments pass through a cooling tube 75 and past a lubricating roller 76 by means of which a suitable finish is applied to them. A waste roller 77 is provided, extending along the front of the machine, to facilitate the starting of the spinning operation and the throwing-on of the filaments 70 to join the tow 74.

Referring now to Figure 3, the clutch assembly 69 is mounted beneath the frame plate 61 and comprises a housing 78 containing a 4-jawed chuck member 79. The lower part 81 of the chuck member 79 is tubular, is furnished with a projecting collar 82 and is formed with 4 apertures 83. The upper part 84 is split into four sections above the apertures 83 and is of conical exterior form to match the conical inner surface 85 of the clutch housing 78. The inner surfaces of the upper part 84 are serrated or formed with a screw thread 86 to enable them to grip the column of tablets 87 passing through the assembly. The four sections of the clutch member are sprung slightly outwards so that they will not engage the tablets 87 unless the member 79 is forced upwards so that the engagement of the conical surface 85 closes the sections on the tablets 87. This is effected by means of a double lever 88 pivoted at 89 to the lower part of the clutch housing 78 and engaging, at one end, beneath the collar 82, the clutch housing 78 being cut away at 91 to accommodate the lever 88. The other end of the lever 88 is engaged from above by a spring 92 which can be forced down upon the lever by means of a control rod 93 which extends upwards through the frame plates 58, 59, 61. A horizontal finger 94 on the control rod 93 is engaged by a rod 95 extending through a gland 96 in the bottom of the air cylinder 49. When the charge of tablets in the magazine 56 is exhausted, the piston 97 in the cylinder 49 engages and forces down the rod 95 thereby forcing down the control rod 93, compressing the spring 92, and forcing the chuck member 79 upwards to grip the tablets within the housing 78. At the same time, the supply of compressed air is cut off from the top of the cylinder 49 and connected to the bottom of the cylinder so that the ram 48 is raised to the top of its throw. This is effected by means of an air valve 98 of known type having a snap action, the operating lever 99 of the valve 98 being connected to the top of the control rod 93. On the raising of the ram, relieving the pressure on the top of the column of tablets, spinning continues by reason of the gripping of the column by the clutch housing 78 and the rising of the plate 65 and the jet assembly 63 under the action of the four tension springs 68. This enables spinning to continue while the empty magazine 56 is replaced by a fresh one. The raising of the ram 48 relieves the pressure on the rod 95, but the control rod 93 is nevertheless held in the depressed position by means of a pawl 101 engaging over a collar 102 of the control rod, so that pressure is maintained on the clutch spring 92.

Changing of the magazine 56 is effected by means of a pair of hammers 103, 104 secured to a spindle 105 mounted between the frame plates 59, 61. The spindle 105 is spring-loaded to drive the hammers into engagement with the fresh magazine 56' but is restrained by means of a pin 106 extending downwards through the plate 59 in the way of the upper hammer 103. The pin 106 is enlarged, above the plate 59, and is cut away at one side for engagement by a horizontal lever 107 pivoted at 108 above the frame plate 59. The lever 107, as shown in Figure 4, extends partly over the bore of the magazine 56, passing close to the ram 48 but over the enlarged head 109 thereof. When the ram 48 is raised, the head 109 engages beneath and lifts the lever 107, thereby lifting the pin 106 and releasing the hammers 103, 104. The new magazine 56' is thereby driven into the working position, in line with the ram 48 and the clutch assembly 69, displacing the exhausted magazine 56 which is brought up against stop pins 111 in the position indicated at 56" in Figure 5. The magazines are guided in their motions by means of a guide plate 112 and are located in the working position by means of a block 113 on one side and a V-notched, spring-loaded lever 114 on the other, the lever 114 being pushed out of the way by the passage of the new magazine into its working position. These details are shown in Figure 5 with respect to the frame plate 61, and are reduplicated at the upper end of the magazine 56 on the underside of the frame plate 59. The hammer 104 on the plate 61, however, is provided with a re-setting handle 115 which is not provided on the hammer 103 beneath the plate 59.

After changing the magazine, spinning continues under the influence of the tension springs 68 until the floating plate 65 has risen to a determined position, when a collar on one of the rods 66 reaches the tail of the pawl 101 and disengages the pawl from the collar 102. The control rod 93 then moves upwards under the influence of a spring 116 engaged from below by an extension 117 of the lever 107 and acting on the under surface of the finger 94. The raising of the control rod 93 relieves the pressure on the spring 92 and changes the valve 98, so supplying air to the top of the cylinder 49 and bringing the ram 48 down into engagement with the tablet in the magazine 56. Spinning then continues under the pressure exerted by the ram. During the period taken for the exhaustion of the magazine 56, the floating plate 65 and jet assembly 63 are forced downwards so as to be ready to rise again when a further charge of magazines is effected.

In the third form of apparatus, shown in Figure 6, the units of solid material supplied are much smaller, being in the form of single circular tablets 121 ⅜" in diameter and 3/16" thick. These are fed to the top of a cylindrical housing 122 having a flange 123 at its lower end beneath which the jet strip 124 is clamped. The tubular housing 122 passes through a hole in a plate 125 fixed to the frame of the machine and is supported on two compression springs 126 rising from the plate 125, one on each side of the tube 122, and acting at their upper ends on a movable horizontal plate 127 fixed to the upper end of the tubular housing 122. Fixed above the tubular housing 122, and constituting a continuation thereof, is a 3-jawed chuck 128 of the same internal diameter as the housing 122, the jaws 129 of the chuck together constituting an upwardly pointing truncated cone which fits into a corresponding coned recess 130 in a chuck housing 131. The jaws 129 are urged upwards into the chuck housing 131 by means of suitable springs 132. The inner cylindrical surfaces 133 of the chuck jaws 129 are serrated by means of a fine buttress thread cut in the conjoined surfaces. The chuck housing 131 is mounted on the frame of the machine at 134.

Above the chuck housing 131, and mounted in a suitable guide tube 135, is a ram 136 which is loaded upwards by means of a spring 137. Above the ram 136 is a lever 138, swinging on a horizontal axis 139 offset from the centre line of the chuck 128 and tablet housing 122. An adjustable screw 140 extending through the lever engages the top of the ram 136 and can force the ram down against the action of the spring 137. On the opposite side of its pivot 139 the lever 138 is connected by a rod 141 to a rotatable cam 142 mounted on a cam shaft 143 driven at constant speed through a clutch 144. The point of connection 145 can be varied along the length of the lever 138 so as to provide an adjustment of the angular throw of the lever, and therefore of the stroke of the ram 136. On a level with the top of the chuck housing 131 is a channel 146 of rectangular cross-section, the upper side of which communicates at a point offset from the chuck 128 with a tubular magazine 147 for the tablets 121 to be fed, the sides of the magazine 147 being slotted at 148 to facilitate the handling of the tablets 121 when filling the magazine. The lowermost tablet 121 of the magazine drops into the rectangular passage 146, which is of such a size that the tablet can be slid along the passage and beneath the ram 136 by a plunger 149 loaded by a spring 151. The plunger 149 is reciprocated by means of a bell-crank lever 152 pivoted beneath the plunger 149 and connected, by a suitable link 153, with an extension of the lever 138.

In the operation of the device the rotation of the driving cam 142 rocks the lever 138 counterclockwise so as to press the ram 136 steadily down on the top of the column of tablets 121 and to urge the leading (lower) face of the column against the upper face of the jet strip 124. In this way the material at the leading face of the column is fused by heat generated in the jet strip 124 by electric current supplied through the leads 32, and the fused material is extruded in the form of filaments 70. The filaments are drawn away by a feed roller 52 and supplied thereby to a ring-spindle or other suitable collecting device 150. Continued rotation of the cam 142 rocks the lever 138 clockwise, and allows the ram 136 to rise but the column of tablets 121, instead of rising to follow the ram, is gripped by the jaws 129 of the chuck 128 and prevented from rising. Nevertheless, the jet 124 does rise, under the influence of the springs 126, so that spinning of the filaments 70 continues.

As the ram 136 continues to rise the bell-crank lever is operated, a fresh tablet 121 is slid into position from the bottom of the magazine 147, along the channel 146 and over the column of tablets 121 previously supplied. The ram 136 then comes down again and, when it engages the top of the new tablet 121, forces the whole of the column downwards against the jet 124. The column is then forced downwards at a rate faster than the linear rate at which it is used up by the extrusion of the filaments 70 so that the jet 124 is also forced down, against the action of the springs 126. The column is freed on its downward movement from the gripping action of the chuck 128, whose function it is to prevent the column from moving upwards but to leave it free to be moved downwards. When the downward movement of the ram ceases the cycle is repeated. Thus, while the column of tablets 121 alternately descends and remains stationary, the jet alternately falls and rises over a short range of cyclical movement, once in each revolution of the cam 142.

The clutch 144 driving the cam shaft 143 is electrically operated and is controlled by a switch 154 actuated in accordance with the general height of the range of cyclical movement of the floating jet assembly 122—127. When the range of movement is relatively high the supply mechanism above described continues to act in the manner described. The rate of descent of the column 121 as dictated by the cam 142, is on the average (allowing for the periods when the column is not moving downwards at all) slightly greater than that at which the solid material in the form of tablets 121 is melted by contact with the jet strip 124. Consequently the range of movement of the jet assembly 122—127 moves downwards. When the lowest point of the range reaches a lower datum level, the switch 154 is actuated so as to disengage the clutch 144 and bring the feeding mechanism to rest. The feeding mechanism is stationary until such a quantity of filament-forming material has been spun that the jet assembly 122—127 rises to an upper datum level, when it actuates the switch 154 again, so as to reengage the clutch 144.

Alternatively the cam 142 can be constantly driven so that the filament-forming material is supplied at a constant average rate. The switch 154 can then be arranged, as shown in Figure 7, to vary the current supplied to the jet strip 124 so as to adjust the rate of melting to be equal to the rate of feeding. For this purpose, a shunt resistance 155 can be connected to the power leads 32, in parallel with the jet 124 and in series with a switch 156 operated by a relay 157 controlled in turn by the switch 154. Thus, when the jet 124 is forced down to a lower datum position, the switch 154 is actuated so as to disconnect the resistance 155, whereby more current is supplied through the jet 124. The filament-forming material is thereby caused to melt more freely and the rate of consumption thereof is sufficiently increased for the jet to rise to an upper datum position where it again operates the switch 154 and, through the relay 157, again connects the shunt resistance 155.

Having described our invention, what we desire to secure by Letters Patent is:

1. Apparatus for the production of artificial filamentary products, said apparatus comprising a surface adapted to be heated, means for urging a series of blocks constituting a column of solid material against said surface so as to fuse the material at the leading face of said column, means for resiliently urging said surface against said leading face, means for applying pressure to the rear face of said column to move it forward against said surface and means for laterally gripping said column to hold it stationary while the pressure on its rear face is relieved for the purpose of adding fresh material at said rear face.

2. Apparatus according to claim 1 comprising, as the heated surface, a plate having spinning orifices therein for forming the fused material into filamentary products.

3. Apparatus according to claim 2 comprising means for passing an electric current through the plate so as to generate heat electrically in the substance of said plate.

4. Apparatus according to claim 1 including a cylinder and a fluid-operated ram therein for applying pressure to the rear face of the column.

5. Apparatus according to claim 1 including cam means for intermittently applying mechanical pressure to the rear face of the column.

6. Apparatus according to claim 1, said apparatus including fluid pressure means adapted to apply a constant pressure to the rear face of the column of solid material, and means adapted, as the plate moves in direction opposite to the direction of movement of the column of solid material and passes a predetermined point, to initiate in succession lateral gripping of the column, release of the pressure, feeding of fresh material to the rear of the column, reapplication of the pressure and release of the column laterally.

7. Apparatus according to claim 1, said apparatus including cam operated means for intermittently applying mechanical pressure to the column of solid material and for feeding fresh solid material to the rear of the column in intervals between the applications of pressure, and means adapted, whenever the plate moves beyond a predetermined point in the direction of feed of the column, to discontinue operation of the said cam operated means until the plate has returned past said predetermined point.

8. Apparatus according to claim 1, said apparatus including means for passing an electric current through the plate to heat it, a ram adapted to engage the column of solid material and advance it towards the plate, cam operated means adapted to advance said ram intermittently but at a constant average rate, and means adapted to diminish the electric current when the plate moves from a predetermined position towards the column of solid material and to increase the current when the plate moves from said predetermined position away from the column of solid material.

References Cited in the file of this patent

UNITED STATES PATENTS

| | | |
|---|---|---|
| 779,313 | Putnam | Jan. 3, 1905 |
| 1,828,413 | Holmes | Oct. 20, 1931 |
| 1,857,791 | Peiler | May 10, 1932 |
| 2,234,986 | Slayter et al. | Mar. 18, 1941 |
| 2,253,089 | Nydegger | Aug. 19, 1941 |
| 2,253,176 | Graves | Aug. 19, 1941 |
| 2,369,506 | Weibel | Feb. 13, 1945 |
| 2,369,553 | Fields | Feb. 13, 1945 |
| 2,657,427 | Upton | Nov. 3, 1953 |

FOREIGN PATENTS

| | | |
|---|---|---|
| 152,179 | Australia | July 3, 1953 |
| 1,102,656 | France | Oct. 25, 1955 |